(12) United States Patent
Ito

(10) Patent No.: US 8,089,709 B2
(45) Date of Patent: Jan. 3, 2012

(54) LENS ARRAY UNIT, OPTICAL HEAD AND INFORMATION PROCESSING APPARATUS

(75) Inventor: Katsuyuki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/461,928

(22) Filed: Aug. 28, 2009

(65) Prior Publication Data

US 2010/0073780 A1    Mar. 25, 2010

(30) Foreign Application Priority Data

Sep. 22, 2008 (JP) ................. 2008-242711

(51) Int. Cl.
 G02B 9/04 (2006.01)
 G02B 27/10 (2006.01)
 G03B 21/60 (2006.01)

(52) U.S. Cl. ............... 359/793; 359/455; 359/618

(58) Field of Classification Search ......... 359/618–621, 359/625–626, 443, 454–455; 264/1.1, 1.32, 264/2.7
See application file for complete search history.

(56) References Cited

U.S. PATENT DOCUMENTS

| | | | |
|---|---|---|---|
| 7,274,514 B2 * | 9/2007 | Uematsu | 359/654 |
| 2002/0124378 A1 * | 9/2002 | Nemoto et al. | 29/450 |
| 2004/0160675 A1 * | 8/2004 | Nemoto et al. | 359/626 |
| 2007/0291370 A1 * | 12/2007 | Uehara et al. | 359/620 |
| 2010/0027129 A1 * | 2/2010 | Sato et al. | 359/622 |

FOREIGN PATENT DOCUMENTS

| | | |
|---|---|---|
| JP | 2000-221445 A | 8/2000 |
| JP | 2003-266779 A | 9/2003 |
| JP | 2004-294270 A | 10/2004 |
| JP | 2008-083576 A | 4/2008 |
| JP | 2008-201121 A | 9/2008 |
| JP | 2009-037200 A | 2/2009 |

* cited by examiner

Primary Examiner — Dawayne Pinkney
(74) Attorney, Agent, or Firm — Rabin & Berdo, P.C.

(57) ABSTRACT

A lens array unit includes first lens array plates, second lens array plates and a support member. Each of the first lens array plate has multiple first lenses thereon. Each of the first lenses has a first optical axis that extends in a first direction and the first lenses are arranged in a second direction perpendicular to the first. Each of the second lens array plates has multiple second lenses thereon. Each of the second lenses has a second optical axis that extends in the first direction and the second lenses are arranged in the second. The support member has opposite first and second sides. The support member extends in the second direction to support the first lens array plates on the first side and support the second lens array plates on a second side so that each of the first lens array plates opposes a different corresponding one of the second lens array plates. The first lens array plates are arranged on the first side of the support member in the second direction and the second lens array plates are arranged on the second side of the support member in the second direction.

18 Claims, 7 Drawing Sheets

LENS ARRAY UNIT, OPTICAL HEAD AND INFORMATION PROCESSING APPARATUS

CROSS-REFERENCE TO RELATED APPLICATIONS

This application claims priority based on 35 USC 119 from prior Japanese Patent Application No. P 2008-242711 filed on Sep. 22, 2008, the entire contents of which are incorporated herein by reference.

BACKGROUND OF THE INVENTION

1. Field of the Invention

This application relates to a lens array unit for use in an information processing apparatus such as an image forming apparatus or an image reader, and also relates to an optical head that includes the lens array unit. Additionally, the application relates to the information processing apparatus that includes the optical head.

2. Description of the Related Art

A rod lens array unit is well known as a conventional lens array unit. The rod lens array unit may be used in an electrophotographic image forming apparatus with an LED (Light-Emitting Diode) head in which LEDs are linearly arranged or in an image reader such as a scanner or a facsimile machine that reads an image on a document by using a light receiving unit in which light receiving elements are linearly arranged. An optical system including the rod lens array unit can form an erected equal magnification image of an object.

Another conventional lens array unit includes two lens array plates that are arranged parallel to form an erected equal magnification image of an object. Micro lenses are linearly arranged on each of the lens array plates. The lens array plate with the micro lenses can be made by plastic injection molding. Japanese Patent Laid-Open No. 2000-221445 discloses one such lens array unit.

In the aforementioned lens array unit, however, if the lens array plate on which the micro lenses are linearly arranged is made by plastic injection molding, the micro lenses are not uniform in shape. This is due to temperature non-uniformity of a mold in a longitudinal direction of the lens array plate, and the difference in resin injection pressure between that in the vicinity of a gate, or a resin inlet of the mold, and that at a location distant from the gate. Therefore, the conventional lens array unit is unable to form an image of an object at a desired resolution.

SUMMARY OF THE INVENTION

An object of the application is to disclose a lens array unit, an optical head and an information processing apparatus capable of forming an image of an object at a desired resolution.

A lens array unit includes first lens array plates, second lens array plates and a support member. Each of the first lens array plates has first lenses thereon. Each of the first lenses has a first optical axis that extends in a first direction and the first lenses are arranged in a second direction perpendicular to the first direction. Each of the second lens array plates has second lenses thereon. Each of the second lenses has a second optical axis that extends in the first direction and the second lenses are arranged in the second direction. The support member has opposite first and second sides. The support member extends in the second direction to support the first lens array plates on the first side and support the second lens array plates on the second side so that each of the first lens array plates opposes a different corresponding one of the second lens array plates. The first lens array plates are arranged on the first side of the support member in the second direction and the second lens array plates are arranged on the second side of the support member in the second direction.

In another aspect, an optical head includes the lens array unit, and in still another aspect, an information processing apparatus includes the optical head.

The full scope of applicability of the lens array unit, the optical head and the information processing apparatus will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The lens array unit, the optical head and the information processing apparatus will become more fully understood from the detailed description given herein and the accompanying drawings, which are given by way of illustration only, and thus do not limit the invention, and wherein.

DETAILED DESCRIPTION OF THE INVENTION

Preferred embodiments of a lens array unit, an optical head and an information processing apparatus according to the invention will be described in detail with reference to the accompanying drawings. In each embodiment, the description will be given with a printer as an information processing apparatus.

First Embodiment

Figure 1:
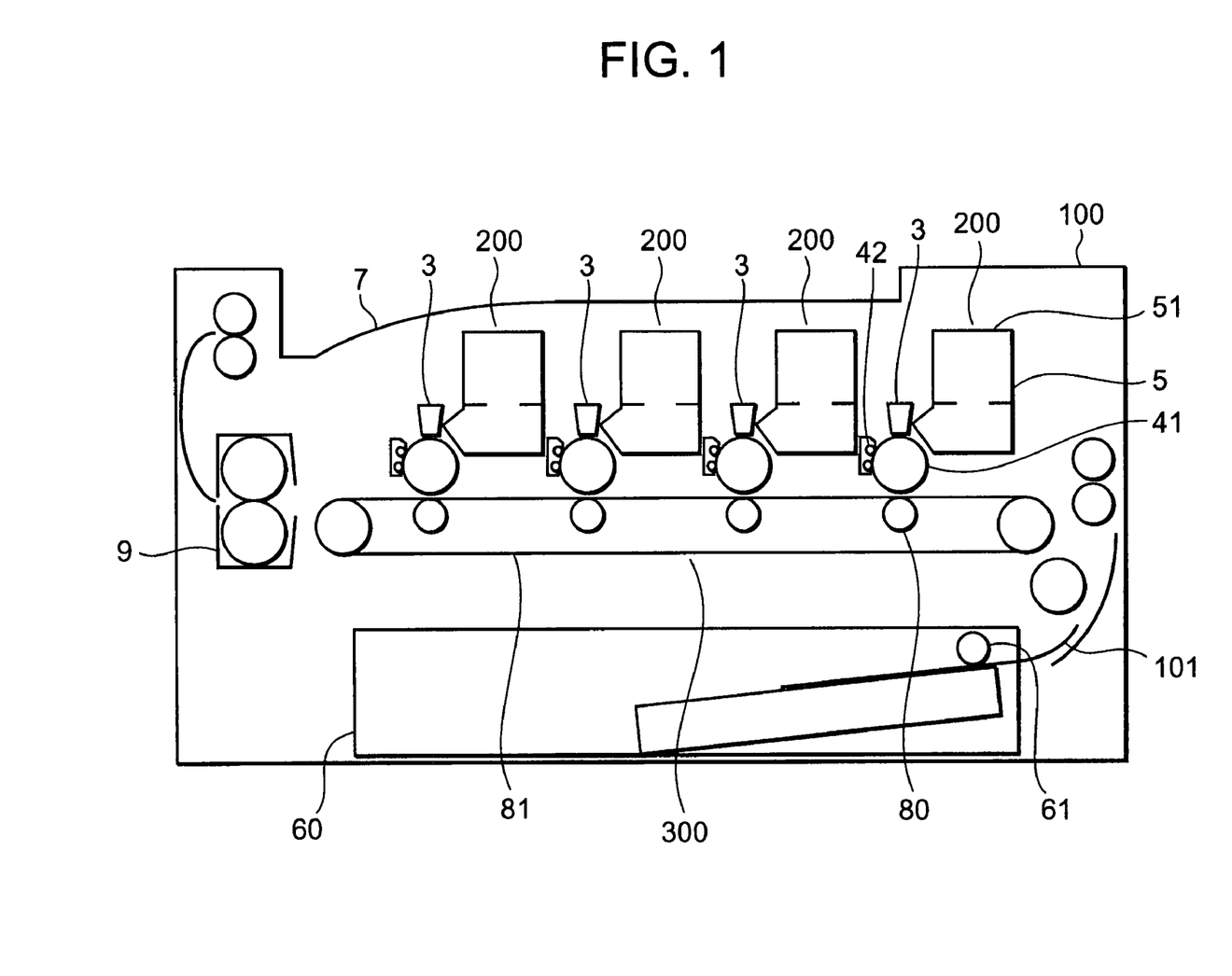
FIG. 1 is a schematic view of a pertinent portion of a printer according to a first embodiment.

FIG. 1 is a schematic view of a pertinent portion of a printer 100 according to a first embodiment, which forms an image on a sheet 101 (medium 101) according to image data with toner made of resin containing a colorant. The printer 100 may include a sheet cassette 60, a feed roller 61, image-forming units 200, LED heads 3, a transfer unit 300 and a fixing unit 9. The sheet cassette 60 accommodates a stack of sheets 101. The feed roller 61 feeds each sheet 101 accommodated in the sheet cassette 60 to the image-forming units 200.

The image-forming units 200, which respectively form a yellow toner image, a magenta toner image, a cyan toner image and a black toner image, are arranged in series along a transport path of the sheet 101. Each of the image-forming units 200 may include a photosensitive drum 41, a charging roller 42, a developing section 5 and a toner cartridge 51. An electrostatic latent image is formed on a surface of the photosensitive drum 41, or image bearing body. The charging roller 42 charges the surface of the photosensitive drum 41 by applying an electric charge to the drum 41. The developing section 5 develops the electrostatic latent image formed on the photosensitive drum 41 with toner to form a toner image. The toner cartridge 51 supplies the developing section 5 with toner.

The LED head 3, or an optical head, is provided in opposition to the surface of the photosensitive drum 41. The LED head 3 selectively illuminates the surface of the photosensitive drum 41 charged by the charging roller 42 to form the electrostatic latent image on the drum 41 in accordance with image data.

The transfer unit 300 may include transfer rollers 80 and a transfer belt 81. Each of the transfer rollers 80 is disposed in opposition to the photosensitive drum 41 through the transfer belt 81. The transfer roller 80 transfers the toner image formed on the photosensitive drum 41 to the sheet 101 advanced by the transfer belt 81. The fixing unit 9 that is downstream of the transfer unit 300 fixes the toner image transferred to the sheet 101 onto the sheet 101 with heat and pressure. The sheet 101 having the fixed toner image thereon is delivered to a sheet stacker 7.

An electric power supply, not shown, applies predetermined voltages to the charging roller 42 and the transfer roller 80. Motors and trains of gears, not shown, drive the transfer belt 81, the photosensitive drum 41 and each roller (e.g. the charging roller 42 or the transfer roller 80). The developing section 5, the LED head 3, the fixing unit 9 and the motors are connected to an electric power supply and a controller that controls their movement.

The printer 100 has an external interface that receives image data from an external device and forms an image on the sheet 101 in accordance with the image data received by the external interface. The printer 100 also has a processor that controls the entire printer 100 with control programs stored in a memory.

Figure 2:
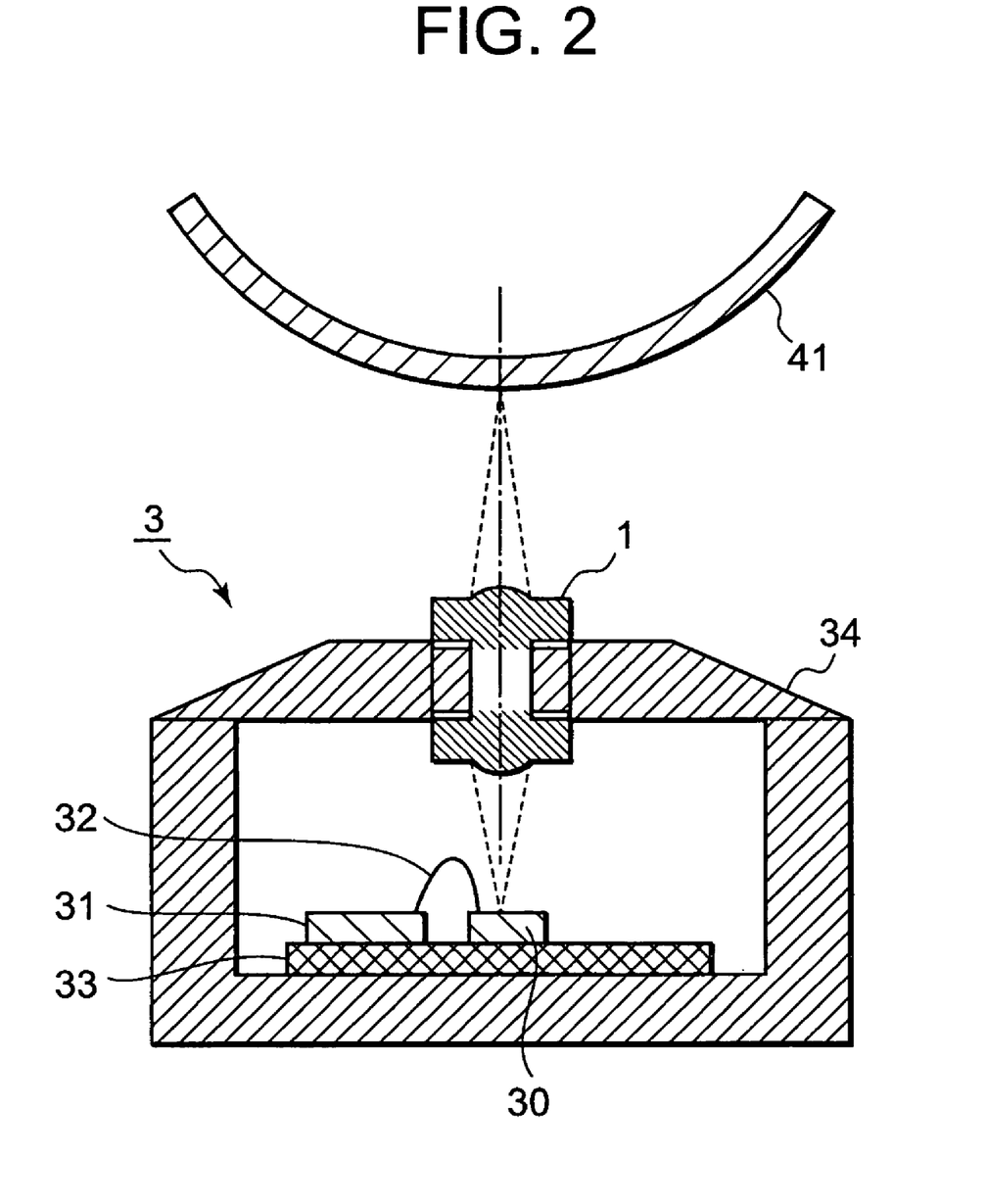
FIG. 2 is a sectional view of an LED head.

FIG. 2 is a sectional view of the LED head 3, which may include an lens array unit 1, LED elements 30, driver ICs 31, a wiring board 33 and a holder 34. The lens array unit 1 is mounted to the holder 34. The holder 34 incorporates the LED elements 30, the driver ICs 31 and the wiring board 33 therein. The LED elements 30 and the driver ICs 31 are provided on the wiring board 33 and are connected to each other via wires 32. The driver ICs 31 drive the LED elements 30 to emit light. The light emitted from the LED elements 30 in accordance with image data is conducted to the photosensitive drum 41 through the lens array unit 1 and is focused onto a surface of the photosensitive drum 41 to form an electrostatic latent image.

In the first embodiment, the LED head 3 has a resolution of 600 dpi (dots per inch). That is, the LED head has 600 LED elements 30 per one inch. Thus, the LED elements 30 are arranged at intervals of 0.0423 mm.

Figure 3A:
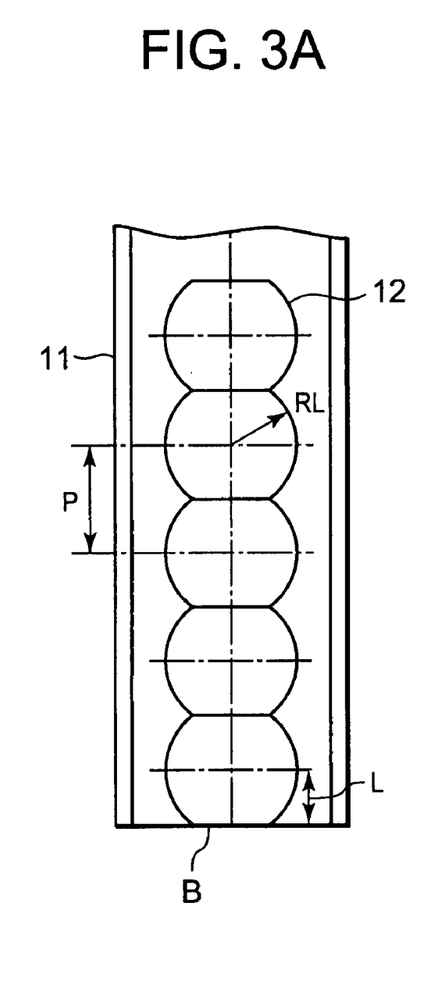
FIG. 3A is a plan view of a lens array plate of a lens array unit.
Figure 3B:
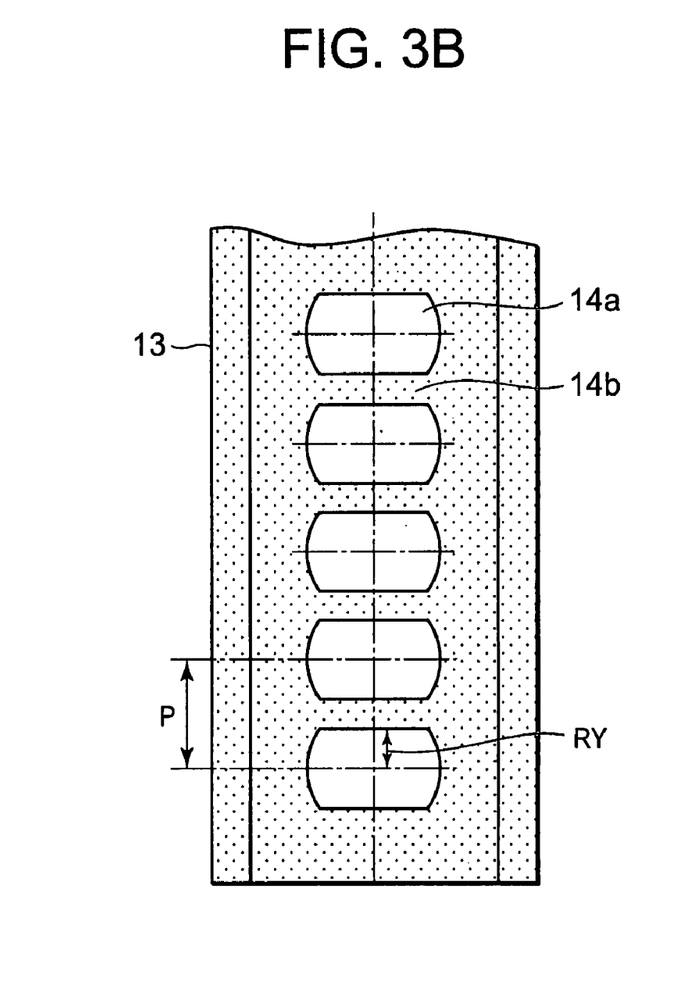
FIG. 3B is a plan view of a support member of the lens array unit.

FIGS. 3A and 3B are plan views respectively of a lens array plate 11 and a support member 13, of the lens array unit 1. Referring to FIG. 3A, micro lenses 12 are aligned on the lens array plate 11 in a direction perpendicular to their optical axes. The radius RL of each micro lens 12 is greater than half of the center distance P between any two adjacent micro lenses, or P/2. Therefore, two adjacent micro lenses 12 partially overlap each other. In other words, each micro lens 12 has a diameter 2RL that is greater than the micro lens array pitch P (center distance P), and has a shape where the overlapped portion is clipped off. Thus, in plan view, the micro lenses 12 together have the shape of the outer boundary of a succession of partially overlapping disks of equal diameter.

The lens array plate 11 is cut along the overlapped portion so that a distance L between an edge of the plate and a center of the outermost micro lens 12, which is the closest to the edge, is to be P/2−10 µm. That is, a cut surface B of the lens array plate 11 is located at the distance L from the center of the outermost micro lens 12.

In cases where the lens array plate 11 is made by injecting resin into a mold that is configured to receive resin from only one direction along a longitudinal direction of the lens array plate 11, or the direction in which the micro lenses 12 are arranged, wherein an end of the lens array plate 11 closer to a resin inlet of the mold is cut after molding. That is, the cut surface B is located at the end of the lens array plate 11 closest to the resin inlet of the mold.

Referring to FIG. 3B, the support member 13 includes openings 14a. A center distance between any two adjacent openings 14a is defined as P. That is, the array pitch of the openings 14a is the same as the array pitch of the micro lenses 12 aligned on the lens array plate 11. The width of the opening 14a, or length of the opening 14a in the direction in which the micro lenses 12 are arranged, is defined as 2RY. The width 2RY is less than the center distance P. Part of the support member 13 that encompasses the openings 14a serves as a light shield portion 14b. The support member 13 is made of black resin so that the light shield portion 14b can absorb and shield part of light coming from the LED elements 30 to the lens array unit 1.

Figure 4:
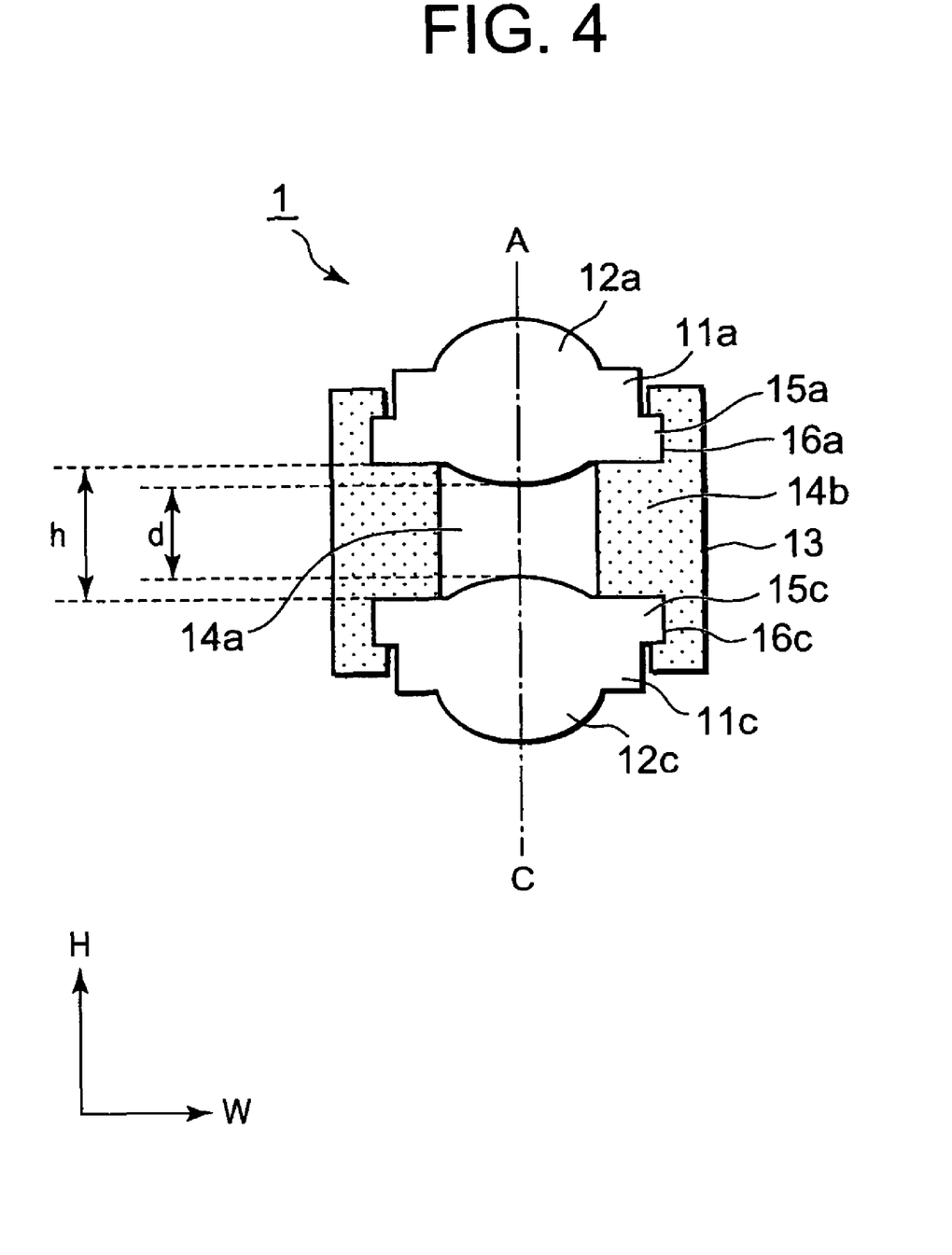
FIG. 4 is a sectional view of the lens array unit.

FIG. 4 is a sectional view illustrating the lens array unit 1. Referring to FIG. 4, an upper lens array plate 11a and a lower lens array plate 11c, which have the same structure as the lens array plate 11, are formed with respective projections 15a and 15c. The projections 15a and 15c fit into grooves 16a and 16c, or holding portions, provided in the support member 13. Since the support member 13 is made of resin, it is elastically deformable so that the projections 15a and 15c can fit easily into the grooves 16a and 16c. Moreover, the support member 13 can easily return to its original shape, so that it can firmly hold the lens array plates 11a and 11c.

The lens array plates 11a and 11c are mounted respectively to the upper and lower portions of the support member 13. The lens array plates 11a and 11c oppose each other so that an optical axis A of a micro lens 12a and an optical axis C of a micro lens 12c are coincident with each other. The optical axes A and C also coincide with a center of the opening 14a. In the first embodiment, the micro lenses 12a and 12c are disposed on a light output side (an upper side) and a light input side (a lower side) of the opening 14a, respectively. The amount of clearance d between the lens array plates 11a and 11c depends upon the depth h of the opening 14a, and is adjusted, so that light emitted from the LED elements 30 is properly focused onto the photosensitive drum 41 to form there an electrostatic latent image.

Figure 5:
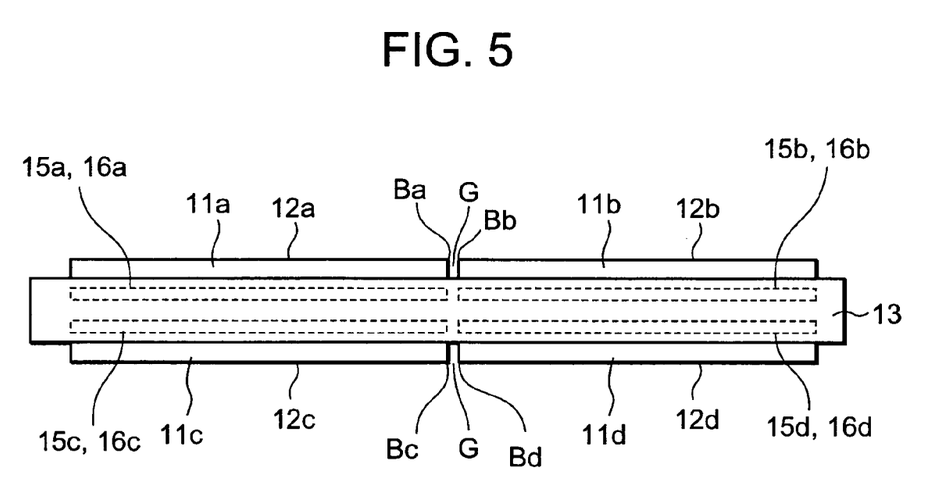
FIG. 5 is a side view of the lens array unit.

FIG. 5 is a side view illustrating the lens array unit 1, in which four lens array plates 11a, 11b, 11c and 11d are mounted to the support member 13. The lens array plates 11a, 11b, 11c and 11d have the same structure as the lens array plate 11. The lens array plates 11a and 11b are disposed so that a cut surface Ba of the lens array plate 11a and a cut surface Bb of the lens array plate 11b oppose each other in the middle of the support member 13. The lens array plates 11c and 11d are disposed so that a cut surface Bc of the lens array plate 11c and a cut surface Bd of the lens array plate 11d oppose each other in the middle of the support member 13. The lens array plates 11c and 11d respectively face the lens array plates 11a and 11b. The lens array plates 11a, 11b, 11c and 11*d* have projections 15*a*, 15*b*, 15*c* and 15*d* that fit into grooves 16*a*, 16*b*, 16*c* and 16*d* provided in the support member 13.

There are predetermined gaps G between the cut surface Ba of the lens array plate 11*a* and the cut surface Bb of the lens array plate 11*b*, and also between the cut surface Bc of the lens array plate 11*c* and the cut surface Bd of the lens array plate 11*d*. As described above, the cut surface B (Ba, Bb, Bc and Bd) of the lens array plate 11 (11*a*, 11*b*, 11*c* and 11*d*) is located at the distance L(=P/2−10 μm) from the center of the outmost micro lens 12 (12*a*, 12*b*, 12*c* and 12*d*). Therefore, the gap G is 20 μm.

The lens array plates 11*a* and 11*c* are arranged so that different sides of them face each other through the support member 13. The lens array plates 11*b* and 11*b* are also arranged so that different sides face each other through the support member 13. Clearances between the lens array plate 11*a* and 11*c*, and between the lens array plate 11*b* and 11*d* are designed so that light emitted from the LED elements 30 is properly focused onto the photosensitive drum 41 to form there an electrostatic latent image. Optical axes of the micro lenses 12*a* and optical axes of the micro lenses 12*c* are coincident with each other. Additionally, the micro lenses 12*a* and 12*c* are in conjugate relation to each other. Similarly, optical axes of the micro lenses 12*b* and optical axes of the micro lenses 12*d* coincide with each other, and the micro lenses 12*b* and 12*d* are in conjugate relation to each other. Thus, the lens array unit 1 can form an erected equal magnification image of an optical image from the LED elements 30 on the photosensitive drum 41.

In addition, the support member 13 supports two lens array plates 11 that oppose each other, e.g. the lens array plates 11*a* and 11*c* shown in FIG. 4. The support member 13 prevents stay light, which is unwanted light coming from adjacent optical systems, from entering an optical system that is composed of two micro lenses 12 whose axes coincide, e.g. the micro lenses 12*a* and 12*c* shown in FIG. 4. The support member 13 also prevents stay light, or unwanted light, from coming out from the optical system.

In the first embodiment, the lens array plate 11 (11*a*, 11*b*, 11*c* and 11*d*) and micro lenses 12 (12*a*, 12*b*, 12*c* and 12*d*) are integrally formed of cycloolefin optical resin (ZEONEX E48R (R): Zeon Co.) by plastic injection molding, with the use of a mold. The support member 13 is made of polycarbonate by plastic molding. In addition, the support member 13 may be formed of polycarbonate that contains glass fiber, thereby increasing the bending rigidity of the support member 13.

Next, the operation of the printer 100 will be described with reference to FIG. 1. The feed roller 61 picks up and feeds the sheet 101 accommodated in the sheet cassette 60 to the image-forming units 200. The charging roller 42, with a voltage applied thereto from an electric power supply, not shown, charges a surface of the photosensitive drum 41. When the charged surface of the photosensitive drum 41 reaches a point that faces the LED head 3 as the photosensitive drum 41 rotates, the LED head 3 illuminates the surface of the photosensitive drum 41 to form an electrostatic latent image thereon. The developing section 5 develops the electrostatic latent image with toner to form a toner image on the surface of the photosensitive drum 41.

When the toner image on the surface of the photosensitive drum 41 reaches a point that faces the transfer belt 81 as the photosensitive drum 41 rotates, an electric power supply, not shown, applies a voltage to the transfer roller 80, which then can transfer the toner image to the sheet 101. The photosensitive drum 41 and the transfer belt 81 advance the sheet 101 with the toner image thereon to the fixing unit 9 where heat and pressure are applied to fuse the toner image into a permanent image on the sheet 101. The sheet 101 is then delivered to the sheet stacker 7.

Next, the operation of the LED head 3 will be described with reference to FIG. 2. When the driver ICs 31 receive control signals, which are generated on the basis of image data, from the controller of the printer 100, the driver ICs 31 drive the LED elements 30 to emit a predetermined amount of light in accordance with the control signals. The light from the LED elements 30 enters the lens array unit 1 and forms an image on the photosensitive drum 41.

Next, the operation of the lens array unit 1 will be described with reference to FIG. 4. The light from the LED elements 30 comes into the micro lens 12*c*, thereby forming an intermediate image at a point distant from the micro lens 12*c* in an optical axis direction. The micro lens 12*a* forms an optical image from the LED elements 30 on the photosensitive drum 41 on the basis of the intermediate image. The intermediate image formed by the micro lens 12*c* is an inverted image at reduced magnification of the optical image from the LED elements 30. The image formed on the photosensitive drum 41 by the micro lens 12*a* is an inverted image at enlarged magnification of the intermediate image formed by the micro lens 12*c*. Thus, the light emitted from the LED elements 30 passes through the micro lenses 12*c* and 12*a* in turn, thereby forming an erected equal magnification image of the optical image from the LED elements 30 on the photosensitive drum 41. The micro lenses 12*a* and 12*c* configure a telecentric optical system in which a principal ray of light emitted from an object is parallel to the axis A of the micro lens 12*a* and the optical axis C of the micro lens 12*c*. In this manner, the lens array unit 1 forms the erected equal magnification image of the optical image emitted from the LED elements 30 on the photosensitive drum 41.

Rays of light emitted from the LED elements 30 pass through a plurality of pairs of the micro lenses 12*a* and 12*c*, and overlap on the photosensitive drum 41 to form the optical image thereon. In addition, part of rays of light, which have passed through the micro lenses 12*c* and play no role in formation of the optical image, are shielded by the light shield portion 14*b* of the support member 13.

If the lens array plate 11 made by plastic injection molding is greater than 250 mm in length, the micro lenses 12 of the lens array plate 11 are not uniform in shape. This is due to temperature non-uniformity of a mold in a longitudinal direction of the lens array plate 11, and the difference in resin injection pressure between at a portion in the vicinity of a gate of the mold and at a portion distant from the gate.

On the other hand, if the lens array plate 11 made by plastic injection molding is 200 mm or less in length, the micro lenses 12 of the lens array plate 11 are uniform in shape. This is because temperature of a mold is uniform in a longitudinal direction of the lens array plate 11, and there is not so much of the difference in resin injection pressure between at a portion in the vicinity of a gate of the mold and at a portion distant from the gate. Additionally, thickness variation of the lens array plate 11 that is 200 mm or less in length is 30 μm or less. For instance, in the lens array plate 11 that is 100 mm in length, the difference in thickness between at a portion in the vicinity of a gate and at a portion distant from the gate is approximately 10 μm. In the lens array plate 11 that is 200 mm in length, the difference in thickness is approximately 20 μm.

In the first embodiment, a plurality of the lens array plates 11 are arranged in a longitudinal direction of the lens array unit 1. Each of the lens array plates 11 is made by plastic injection molding and is 200 mm or less in length. Therefore, it is possible to make the lens array unit 1 in which the micro lenses 12 are uniform in shape, even if the lens array unit 1 is greater than 250 mm in length, that is, if the support member 13 is greater than 250 mm in length (see FIG. 5).

As shown in FIG. 4, the height of the support member 13 in the direction of arrow H is greater than that of the lens array plate 11 (11a, 11b) and the width of the support member 13 in the direction of arrow W is also greater than that of the lens array plate 11 (11a, 11b). Therefore, the bending rigidity of the support member 13 is higher than that of the lens array plate 11 (11a, 11b), in the directions of both arrows H and W. The bending rigidity of the lens array plate 11 and the support member 13 can be measured by a system shown in FIG. 6.

Figure 6:
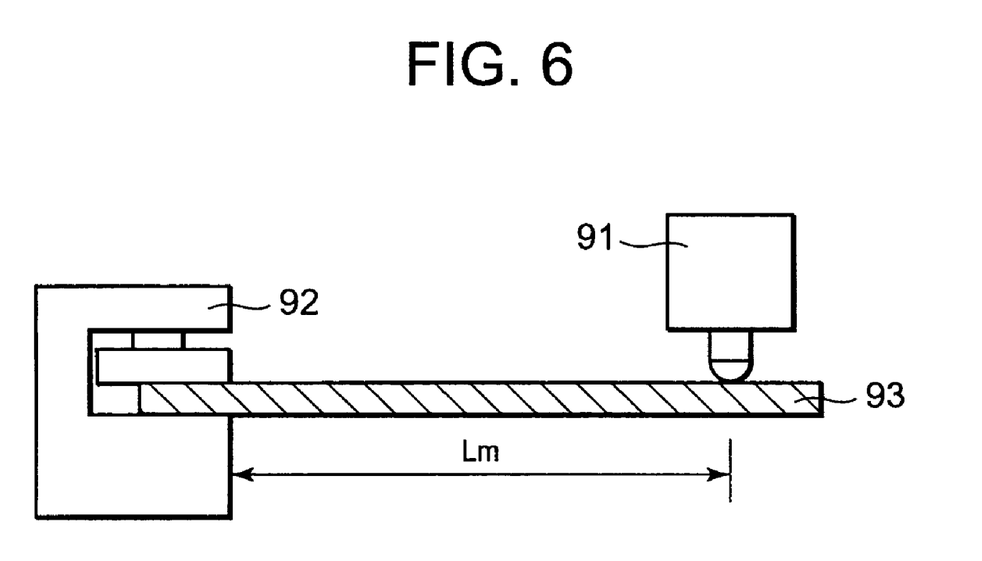
FIG. 6 is a schematic view of a system for measuring the bending rigidity of a sample.

FIG. 6 is a schematic view illustrating the system for measuring the bending rigidity K of a sample 93, i.e. the lens array plate 11 or the support member 13. Referring to FIG. 6, a fixture 92 clamps one end of the sample 93 and a terminal pin of a load displacement gauge 91 is put on the other end of the sample 93. The load displacement gauge 91 is capable of measuring the amount of pushing σ of the terminal pin, which is equivalent to the amount of displacement σ of the sample 93, and a load F on the terminal pin, simultaneously. The bending rigidity K of the sample 93 can be simply obtained by F/K. Here, loads F (gram), at which the amount of displacement σ is 5 mm, are measured regarding the lens array plate 11 and the support member 13 when measured length Lm is 200 mm.

The measurement result shows that the load F that displaces the lens array plate 11 by 5 mm in the optical axis direction is 300 g and also shows that the load F that displaces the support member 13 by 5 mm in the optical axis direction is 1000 g. Consequently, the bending rigidity K of the lens array plate 11 is 60 g/mm and the bending rigidity K of the support member 13 is 200 g/mm. Thus, in the first embodiment, the bending rigidity of the support member 13 in the optical axis direction is more than three times greater than that of the lens array plate 11 in the same direction. Therefore, even if the lens array plate 11 is warped in the optical axis direction, it is possible to reduce the warpage of the lens array plate 11 by the support member 13. In addition, the projections 15 of lens array plate 11 fit into grooves 16 of the support member 13, thereby enhancing the effect of the warpage reduction.

In the first embodiment, a plurality of the lens array plates 11, each of which is 200 mm or less in length, are arranged on the lens array unit 1. Therefore, the amount of misalignment between the micro lenses 12 and the openings 14a of the support member 13, which is associated with the difference in the coefficient of thermal expansion between the lens array plates 11 and the support member 13, can be kept within an acceptable range, even when the lens array plates 11 and the support member 13 thermally expand due to a change in operating temperature of the printer 100. This can produce the effect of preventing resolution degradation that results from decrease in the amount of light due to the misalignment between the micro lenses 12 and the openings 14a.

Moreover, since there is the gap G between any two adjacent lens array plates 11, the lens array plates 11 being side-by-side do not come in contact with each other, even when they thermally expand. This can keep the lens array plate 11 from being deformed or damaged.

While the first embodiment has been described with respect to a case where the LED element 30 is used as a light-emitting member, the LED element 30 may be replaced with an organic EL (electroluminescence) element as the light-emitting member.

As described above, in the first embodiment, a plurality of the lens array plates 11, each of which includes a plurality of the micro lenses 12 thereon, are arranged in a longitudinal direction of the lens array unit 1 and are mounted to the support member 13. Therefore, the lens array unit 1 according to the first embodiment can prevent its resolution from degrading and form an image of an object at a desired resolution.

Second Embodiment

Figure 7A:
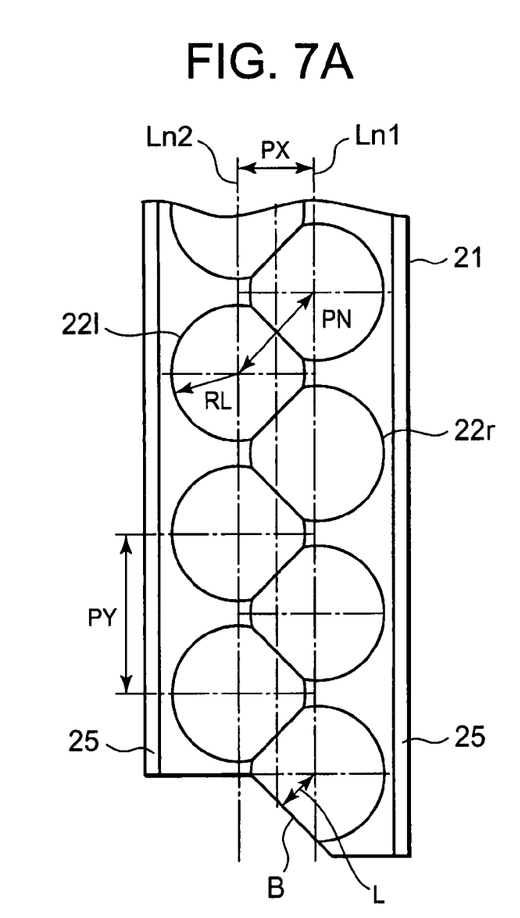
FIG. 7A is a plan view of a lens array plate of a lens array unit according to a second embodiment.
Figure 7B:
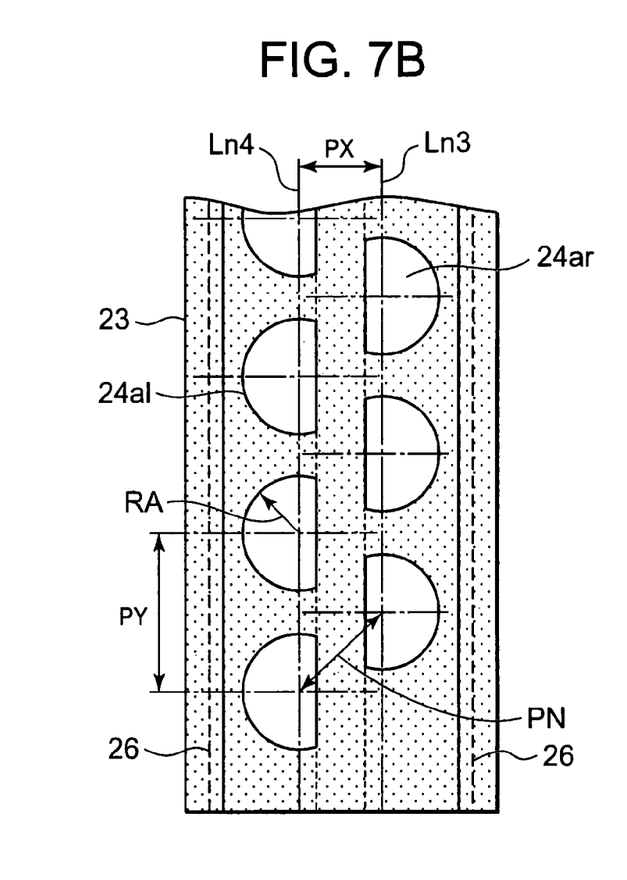
FIG. 7B is a plan view of a support member of the lens array unit according to the second embodiment.

FIGS. 7A and 7B are plan views illustrating respectively a lens array plate 21 and a support member 23 of the lens array unit 1 according to a second embodiment. Elements similar to those in the first embodiment have been given the same numerals and their description is omitted.

Referring to FIG. 7A, micro lenses 22r are aligned on the lens array plate 21 along a line Ln1 that is parallel to the direction perpendicular to optical axes of the micro lenses 22r and micro lenses 22l are aligned on the lens array plate 21 along a line Ln2 that is parallel to the line Ln1. There is a predetermined distance between centers of the adjacent micro lenses 22r and 22l in a direction perpendicular to optical axes of the micro lenses 22r and 22l, or in a longitudinal direction of the lens array plate 21. A center distance between any two adjacent micro lenses 22r along the line Ln1 and a center distance between any two adjacent micro lenses 22l along the line Ln2 are both defined as PY. A distance between the lines Ln1 and Ln2 is defined as PX.

The radius of each micro lens 22r and the radius of each micro lens 22l are both defined as RL. A center distance between any two adjacent micro lenses 22r and 22l is defined as PN. Since the center distance PN is less than twice the radius RL, or 2RL, two adjacent micro lenses 22r and 22l partially overlap each other. Therefore, each of the micro lenses 22r and 22l has a shape where part of the micro lens 22r or 22l is clipped off at the overlapped portion. Thus, in plan view, the micro lenses 22r and 22l together have the shape of the outer boundary of a succession of partially overlapping disks of equal diameter whose centers are disposed along a zigzag path.

As in the case of the first embodiment, for instance, the lens array plate 21 is cut along the overlapping portion so that a distance L between an edge of the lens array plate 21 and a center of the outmost micro lens 22r, which is the closest to the edge, is to be PN/2–10 µm. That is, a cut surface B of the lens array plate 21 is located at the distance L from the center of the outmost micro lens 22r. The lens array plate 21 may be cut by a mechanical cutting machine, an ultrasonic cutting machine, a laser cutting machine or the like.

Referring to FIG. 7B, the support member 23 includes openings 24ar and 24al. The openings 24ar and 24al are arranged respectively to correspond to the arrangements of the micro lenses 22r and 22l. As shown in the figure, a center distance between any two adjacent openings 24ar along a line Ln3 and a center distance between any two adjacent openings 24al along a line Ln4 are both defined as PY. The distance between the lines Ln3 and Ln4 is defined as PX. Optical axes of the micro lenses 22r and 22l are coincident with centers of the openings 24ar and 24al, respectively. The radius of a circular arc portion of each micro lens 22r and the radius of a circular arc portion of each micro lens 22l are both defined as RA. The radius RA is less than the radius RL of the micro lens 22r and of the micro lens 22l.

The lens array plate 21 is formed with projections 25. The projections 25 fit into grooves 26 provided in the support member 23. Since the support member 23 is made of resin, it is elastically deformable so that the projections 25 can fit easily into the grooves 26. Moreover, the support member 23 can easily return to its original shape, so that it can firmly hold the lens array plate 21.

In the same manner as the first embodiment, two lens array plates 21 are arranged at the upper and lower portions of the support member 23 so that different sides face each other. The optical axes of the micro lenses 22r of the two lens array plates 21 coincide with each other. The optical axes of the micro lenses 22l of the two lens array plates 21 are also coincident with each other. Clearance between the two lens array plates 21 depends upon the depths of the openings 24ar and 24al.

In the same manner as the first embodiment, a plurality of the lens array plates 21 are arranged in a longitudinal direction of the lens array unit 1 and are mounted to the support member 23. Moreover, there is a predetermined gap G between any two adjacent lens array plates 21. Note, however, that the adjacent lens array plates 21 are arranged in a relationship where one of the adjacent lens array plates 21 is rotated by 180 degrees with respect to the other around the optical axes of the micro lens 22r (or the micro lens 22l).

Since the operation of the lens array unit 1 of the second embodiment is the same as that of the first embodiment, the description of the operation is omitted.

As described above, in the second embodiment, micro lenses 22r and 22l are arranged in two rows along the lines Ln1 and Ln2 on the lens array plate 21. Therefore, in addition to having the same above-described advantageous effects as the first embodiment, the second embodiment also makes it is possible to form a brighter image with more uniform light on the photosensitive drum 41.

While the first and second embodiments have been described with respect to a case where the LED head in the printer is used as the optical head, a scanning head in an image reader that reads an image on a document may be used as the optical head. Moreover, the printer as the information processing apparatus in these embodiments may be replaced with a copier or a multifunction printer (MFP).

The lens array unit, the optical head and the information processing apparatus being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. A lens array unit comprising:
a plurality of first lens array plates each having opposite first and second sides;
a plurality of first lenses arranged on a first side of each of the plurality of first lens array plates, each first lens having a first optical axis that extends in a first direction, the first lenses being arranged in a second direction perpendicular to the first direction;
a plurality of second lens array plates each having opposite first and second sides;
a plurality of second lenses arranged on a first side of each of the plurality of second lens array plates, each second lens having a second optical axis that extends in the first direction, the second lenses being arranged in the second direction; and
a support member having opposite first and second sides, extending in the second direction to support the first lens array plates on the first side and support the second lens array plates on the second side so that each of the first lens array plates opposes a different corresponding one of the second lens array plates;
wherein the first lens array plates are arranged, in a nonoverlapping manner with respect to the first direction, one after the next in the second direction on the first side of the support member, and the second lens array plates are arranged, in a nonoverlapping manner with respect to the first direction, one after the next in the second direction on the second side of the support member, the second sides of the plurality of the first and second lens array plates being supported by the support member.

2. The lens array unit according to claim 1, wherein the first optical axis of each first lens is coincident with the second optical axis of a corresponding one of the second lenses.

3. The lens array unit according to claim 1, wherein the support member includes a light shield portion that shields part of light passing between the first lenses and the second lenses.

4. The lens array unit according to claim 1, wherein the first lens array plates are arranged side-by-side with a predetermined gap therebetween.

5. The lens array unit according to claim 1, wherein each first lens has a diameter that is greater than an array pitch of the first lenses and the first lenses are side-by-side, partially overlapping each other.

6. The lens array unit according to claim 5, wherein the first lens array plate has a cut surface in a vicinity of the overlapped portion.

7. The lens array unit according to claim 1, wherein, in a plan view, the first lenses together have the shape of the outer boundary of a succession of partially overlapping disks of equal diameter.

8. The lens array unit according to claim 1, wherein the plurality of first lenses are arranged along a first line extending to the second direction, and the first lens array plate further includes a plurality of third lenses each having a third optical axis that extends in the first direction, the plurality of third lenses being arranged along a second line parallel to the first line.

9. The lens array unit according to claim 8, wherein each first lens and the third lens adjacent thereto have respective center points that are separated from each other in the second direction.

10. The lens array unit according to claim 1, wherein the bending rigidity of the support member in the first direction is more than three times greater than the bending rigidity of the first lens array plate in the first direction.

11. The lens array unit according to claim 1, wherein each first lens array plate is made by injecting resin into a mold and by cutting an end of the first lens array plate closer to a resin inlet of the mold after molding.

12. An optical head comprising the lens array unit according to claim 1.

13. An information processing apparatus comprising the optical head according to claim 12.

14. The lens array unit according to claim 1, wherein each first lens array plate has a cut surface, and two successive first lens array plates are arranged in the second direction so that cut surfaces thereof oppose each other.

15. The lens array unit according to claim 1, wherein each second lens array plate has a cut surface, and two successive second lens array plates are arranged in the second direction so that cut surfaces thereof oppose each other.

16. The lens array unit according to claim 1, wherein each of the first lens array plates has a length of 200 mm or less in the second direction.

17. The lens array unit according to claim 1, wherein each of the second lens array plate has a length of 200 mm or less in the second direction.

18. The lens array unit according to claim 1, wherein the support member has a length of 250 mm or more in the second direction.

* * * * *